May 1, 1923.

C. A. HART ET AL 1,453,938

ADJUSTABLE HEADLIGHT ARRANGEMENT FOR MOTOR VEHICLES

Filed April 27, 1922 2 Sheets-Sheet 1

Corda A. and Henry E. Hart Inventor

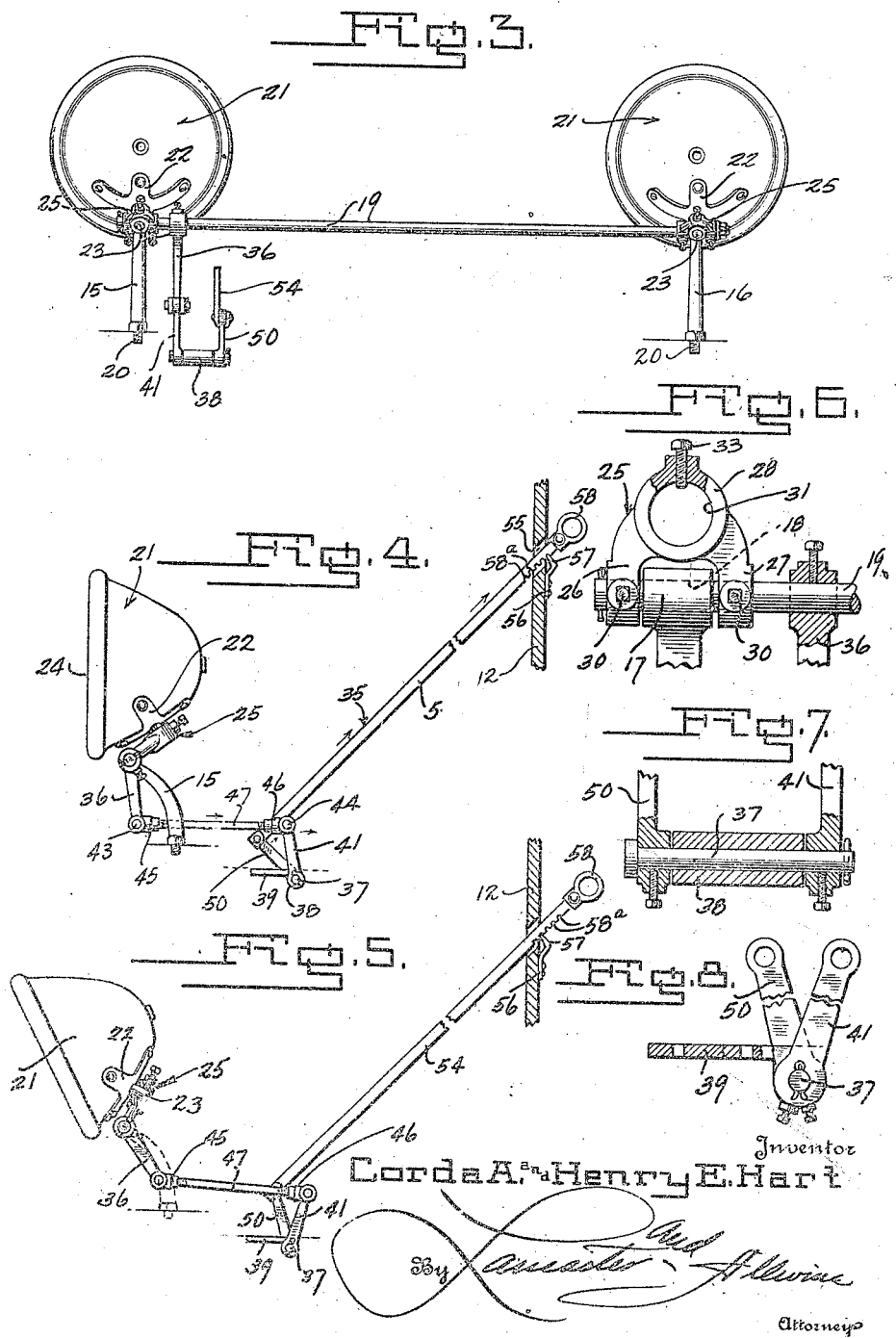

Patented May 1, 1923.

1,453,938

UNITED STATES PATENT OFFICE.

CORDA A. HART AND HENRY E. HART, OF DANVILLE, ILLINOIS.

ADJUSTABLE HEADLIGHT ARRANGEMENT FOR MOTOR VEHICLES.

Application filed April 27, 1922. Serial No. 556,902.

*To all whom it may concern:*

Be it known that we, CORDA A. HART and HENRY E. HART, citizens of the United States, residing at Danville, in the county of Vermilion and State of Illinois, have invented certain new and useful Improvements in Adjustable Headlight Arrangements for Motor Vehicles, of which the following is a specification.

This invention relates to an improved headlight arrangement for motor vehicles, whereby rays of light may be adjusted in a vertical plane for focusing the light rays at varying distances upon a roadway.

The primary object of this invention is the provision of an adjustable head light arrangement for motor vehicles, susceptible of accessory use upon motor vehicles of standard types, whereby ordinary head lamps may be attached thereto, without alteration.

A further object of this invention is the provision of a practical, simple, and easily operated head light arrangement, whereby light rays may be adjusted in a vertical plane, so that the same may be effectively controlled to divert the same in such manner that they will not be an impediment to approaching traffic.

Other objects and advantages of this invention will be apparent during the course of the following detailed description.

In the accompanying drawings, forming a part of this specification, and wherein similar reference characters designate corresponding parts throughout the several views.

Figure 3 is a rear elevation of the improved head light arrangement.

Figure 4 is a fragmentary side elevation of the headlight arrangement, showing the manner in which the same is preferably operated for vertical swinging of a lamp detail thereof.

Figure 5 is a fragmentary side elevation of the details illustrated in Figure 4, however, showing the same in a differently adjusted position, so that the lamp detail thereof will divert light rays.

Figure 6 is a fragmentary view, partly in section, showing the details of the improved headlights, which are adapted to directly receive a lamp.

Figure 7 is a sectional view of a portion of the headlight arrangement, which is adapted for mounting to the chassis frame of a motor vehicle.

Figure 8 is a fragmentary view, partly in section, showing details illustrated in Figure 7, in side elevation.

Figure 1:
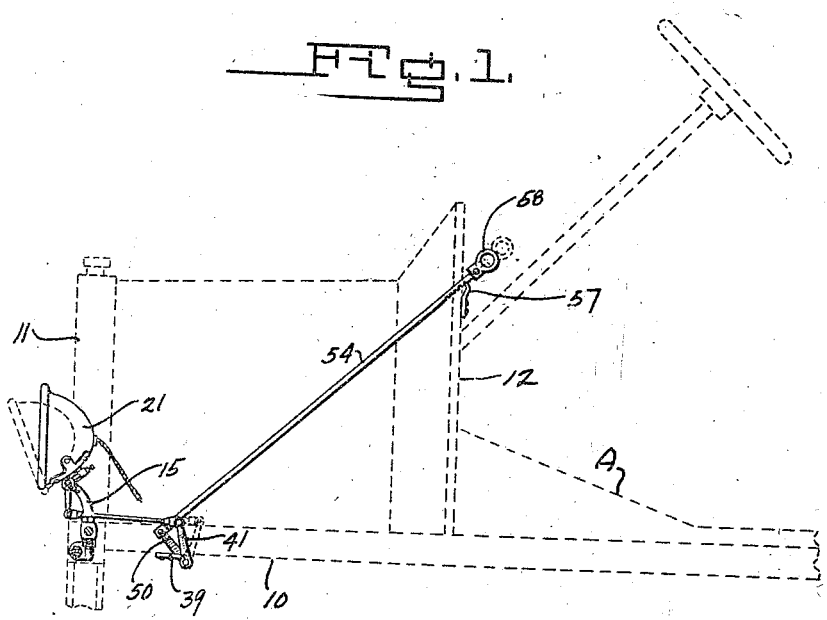
Figure 1 is a side elevation of the improved head light arrangement, showing the same attached to the motor vehicle.
Figure 2:
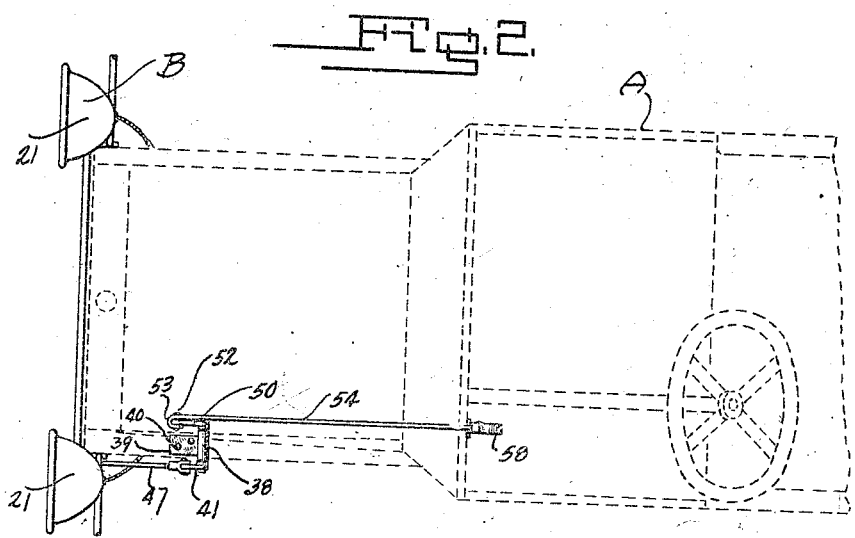
Figure 2 is a plan view of the improved head light arrangement, showing the same arranged with the parts of a motor vehicle.

In the drawings, wherein for the purpose of illustration is shown the preferred embodiment of this invention, the letter A designates a vehicle of any approved type, with which the improved headlight B is adapted for association.

The vehicle A may be of any approved type, although the headlight B will find its general use upon motor vehicles. Consequently, the vehicle A includes the chassis frame 10; radiator 11; and dash 12.

The headlight arrangement B includes a pair of arcuate standards 15 and 16 which are detachably mounted on the chassis frame 10 forwardly of the radiator 11 and upon each side thereof. The tops 17 of the standards 15 and 16 are enlarged and provided with aligning apertures 18, adapted for rotatably receiving a shaft 19 which extends transversely and forwardly of the motor vehicle A. It is to be noted that the socket ends 17 of the standards 15 and 16 extend outwardly from the attaching ends 20 of said standards.

Lamps 21 of the ordinary type, are adapted for use in connection with the head light arrangement B, and are each provided with the bracket 22 upon the rear thereof having the ordinary projecting lug 23 extending rearwardly of the headlight 21. It is to be noted that the axes of the attaching lugs 23, are disposed at acute angles to the plane defined by the face 24 of the lamps 21, as is the case in standard lamp construction.

Clevis members 25 are provided for the lamps 21, so that a lamp may be mounted upon each end of the horizontal shaft 19; adjacent the standards 15 and 16. These clevis members 25 are substantially U-shaped in formation, each including arms 26 and 27 connected by a bight portion 28. The free ends of the arms 26 and 27 are apertured in aligning relation, and are provided with set screws 30, extending radially therethrough into the apertures of said arms, so that said apertures may receive the shaft 19, and have the set screws 30 clamped against the same for adjustably supporting the clevis member 25 in any adjusted position upon the shaft. The bight portion 28 of each clevis member 25 is provided with a socket opening 31, the axis of which extends at right angles to the axes of the apertures in the ends of the arms 26 and 27. This socket opening 31 is adapted for detachably receiving the lamp lug 23, a set screw 33 being provided laterally through the portion 28 for insertion into the socket aperture 31, and whereby the lamp lug 23 may be securely clamped upon its clevis member 25. Thus, it can be seen that the clevis members 25 may be mounted in adjusted relation upon the horizontal oscillating shaft 19, so that the upper ends 17 of the standards 15 and 16 are disposed intermediate the ends of the clevis arms 26 and 27, substantially as is illustrated in Figure 6 of the drawings. In this manner, the lamps 21 may be mounted, by the clevis members 25 upon the shaft 19 in a predetermined relation.

Means 35 for oscillating the shaft 19 from the driver's compartment of the motor vehicle A, is provided, which includes a lever 36 adjustably clamped to the shaft 19 adjacent its standards 15. An auxiliary shaft 37 is rockably supported by a barrel portion 38 of a bracket 39; said bracket being attached as by rivets 40 to the chassis frame 10 upon the left side of the vehicle A so that the ends of said shaft extend outwardly from the ends of said barrel portion 38. The outside end of the rocker shaft 37 is provided with a lever 41 which may be adjustably secured thereto. The ends of the levers 36 and 41 are apertured for receiving pins 43 and 44 respectively, whereby coupling members 45 and 46 respectively, may be attached thereto; said couplings 45 and 46 being provided for receiving a link bar 47, so that the free ends of the levers 36 and 41 may be connected thereby. The inner end of the rocker shaft 37 which extends from the bracket barrel portion 38 is provided with a lever 50 secured thereto. The free end of this lever 50 is apertured, for receiving a pin 52, whereby a hooked end 53 of the operating rod 54 is pivotally connected thereto. The operating rod 54 extends rearwardly of the vehicle A, through a suitable aperture 55 in the dash 12. A catch member 56 is provided upon the dash 12 which includes a projection 57 adapted for cooperation with the toothed depressions 58 formed on the under side of the operating bar 54 adjacent its free end, and whereby said operating rod 54 may be held in any determined relation. A ring or finger engaging member 58 is preferably provided upon the free end of the operating rod 54, whereby a driver of the motor vehicle A may engage the same for reciprocating the operating rod 54.

In operation, when the vehicle is being driven at night time, the lamps 21 will, of course, be illuminated. Should there be no advancing traffic, the headlight arrangement C is positioned substantially as is illustrated in Figure 4 of the drawings, whereby the light rays are cast substantially in horizontal manner forwardly of the vehicle A. However, in the face of advancing traffic, the operator will grasp the ring 58 and by lifting upwardly thereon, the same may be detached from the catch member 56. By pulling rearwardly upon the operating rod 54, the rocker shaft 37 will be oscillated, so that the connecting link 47 will swing the main shaft 19 in oscillating manner. Due to the offset mounting of the lamps 21, by means of the clevis members 25, such action of the vehicle driver will swing the lamps 21 in a vertical plane, downwardly toward the ground surface, so that the light rays emanating from said lamps 21 will be diverted directly upon the road surface forwardly of the vehicle A, and thus not prove an impediment to the approaching traffic. For town or city driving, the lamps 21 may be maintained in the position illustrated in Figure 5 of the drawings, so that the light rays are not cast directly upon approaching traffic.

From the foregoing, it can be seen that a headlight arrangement for motor vehicles has been provided, in which the lamps thereof may be moved in a vertical plane for diverting light rays, so that the same will not glare directly upon advancing traffic. This arrangement is of a character which will permit the attachment of the same upon standard makes of motor vehicles utilizing standard lamps, without the necessity of alteration to the same.

Various changes in the shape, size and arrangements of parts may be made to the form of the invention herein shown and described, without departing from the spirit of the invention or the scope of the claims.

We claim:

1. In a head light arrangement for vehicles, the combination of lamps having lugs projecting therefrom, a shaft oscillatively mounted upon said vehicle, members adjustably positioned upon said shaft for detachably receiving the lugs of said lamps, and means for oscillating said shaft to move said lamps in a vertical plane.

2. A headlight arrangement for motor vehicles comprising standards for attachment to said vehicle, a shaft oscillatively carried at its ends upon said standards, lamps having attaching lugs thereon, a substantially U-shaped clevis member for each of said lamps adapted for straddling said standards for securing the same to said shaft, means for securing the lugs of said lamps to said clevis members, and means for oscillating said shaft, whereby said lamps may be moved in a vertical plane.

3. A headlight arrangement for motor vehicles comprising lamps having attaching lugs thereon, a shaft oscillatively mounted upon said vehicle, members adjustably positioned upon the shaft ends for detachably receiving the lugs of said lamps therein, an auxiliary shaft, levers upon said first mentioned shaft and upon said auxiliary shaft, a link connecting said levers, and means for oscillating said auxiliary shaft.

4. In a headlight arrangement for motor vehicles, the combination with a motor vehicle including a frame, a dash, and lamps therefor having the ordinary attaching lugs thereon, of standards mounted upon said vehicle frame, a shaft oscillativcly carried by said standards forwardly of the motor vehicle, clevis members secured to the ends of said shaft adjacent said standards, said clevis members including sockets for detachably receiving the lugs of said lamps, an auxiliary shaft mounted upon said vehicle frame for oscillation, levers connected to said first mentioned shaft and to said auxiliary shaft, a connecting link attached to the free ends of said levers, a second lever connected to said auxiliary shaft, an operating rod connected to the free end of said last mentioned lever and extending rearwardly to the dash of said motor vehicle, and catch means for supporting said operating rod in a predetermined position, whereby an operator may reciprocate said rod for rocking said auxiliary shaft, so that said first mentioned shaft may be oscillated by means of said connecting link for moving said lamps in a vertical plane.

5. As an article of manufacture, a headlight supporting member substantially U-shaped in formation providing arms and a bight portion, the free ends of said arms being apertured in aligning relation, said bight portion of the supporting member having a socket opening therethrough extending at right angles to the arm apertures.

6. A headlight arrangement for vehicles comprising standards, a shaft operatively carried by said standards, a lamp having an attaching lug extending rearwardly therefrom, and a supporting member substantially U-shaped in formation to provide arms and a bight portion, the free ends of said arms being apertured in aligning relation, said bight portion having a socket opening therethrough extending at right angles to the arm apertures, said arm apertures adapted for securely receiving said shaft, and clamping means for securing the lug of said lamp within the socket of the bight portion of said supporting member.

7. In a device of the class described, the combination with a motor vehicle including a chassis frame, radiator and dash, of arcuate standards connected to said chassis frame to extend forwardly of the radiator, said standards having apertured ends, a main shaft rotatably carried by the apertured ends of said standards to extend transversely of the motor vehicle, lamps having lugs extending rearwardly therefrom, substantially U-shaped supporting members having arms and a bight portion, said arms being apertured upon their free ends for receiving said shaft, whereby said supporting members straddle said standards, each supporting member having a socket opening in the bight portion thereof for receiving the lug of a lamp, a lever connected to said main shaft, an auxiliary shaft, bracket means oscillating mounting said auxiliary shaft upon the chassis, a lever mounted upon the outer end of said auxiliary shaft, coupling members pivotally connected to the free ends of said levers, a link connected at its ends to said coupling members, a lever upon the inner end of said auxiliary shaft, a relatively long operating lever connected to the last mentioned lever and extending through an opening in said dash, and catch means upon said dash for holding said operating lever in a predetermined position.

CORDA A. HART.
HENRY E. HART.